(12) United States Patent
Li et al.

(10) Patent No.: US 11,901,086 B2
(45) Date of Patent: Feb. 13, 2024

(54) INERTIAL ELECTROSTATIC CONFINEMENT FUSION APPARATUS FOR ELECTRON INJECTION NEUTRALIZATION

(71) Applicants: Qixianhe (Beijing) Technology Co., Ltd., Beijing (CN); Jinhai Li, Beijing (CN); Fenhua Li, Beijing (CN)

(72) Inventors: Jinhai Li, Beijing (CN); Shan Jiang, Beijing (CN)

(73) Assignees: Qixianhe (Beijing) Technology Co., Ltd., Beijing (CN); Jinhai Li, Beijing (CN); Fenhua Li, Beijing (CN)

( * ) Notice: Subject to any disclaimer, the term of this patent is extended or adjusted under 35 U.S.C. 154(b) by 0 days.

(21) Appl. No.: 18/059,250

(22) Filed: Nov. 28, 2022

(65) Prior Publication Data
US 2023/0178257 A1 Jun. 8, 2023

(30) Foreign Application Priority Data
Dec. 3, 2021 (CN) .................. 2021111460836.6

(51) Int. Cl.
*G21B 1/15* (2006.01)
*G21B 1/05* (2006.01)
*G21B 1/17* (2006.01)

(52) U.S. Cl.
CPC ............... *G21B 1/15* (2013.01); *G21B 1/05* (2013.01); *G21B 1/17* (2013.01)

(58) Field of Classification Search
CPC ............. G21B 1/05; G21B 1/15; G21B 1/17
See application file for complete search history.

(56) References Cited

U.S. PATENT DOCUMENTS

| | | | | |
|---|---|---|---|---|
| 3,258,402 A | * | 6/1966 | Farnsworth | H05H 1/03 376/105 |
| 3,386,883 A | * | 6/1968 | Farnsworth | G21B 1/03 376/145 |
| 3,530,497 A | * | 9/1970 | Hirsch | H05H 1/03 976/DIG. 4 |
| 4,826,646 A | * | 5/1989 | Bussard | H05H 1/11 376/127 |

(Continued)

FOREIGN PATENT DOCUMENTS

| | | | |
|---|---|---|---|
| CN | 107910074 A | | 4/2018 |
| CN | 109920559 A | * | 6/2019 |

(Continued)

*Primary Examiner* — Lily C Garner

(57) ABSTRACT

The present invention relates to an inertial electrostatic confinement fusion apparatus for electron injection neutralization, which includes a cathode spherical net, an anode, a cathode high-voltage introduction supporting rod, an electron gun for high-energy electron injection, a vacuum system and a high-voltage power supply system. Neutralizing electrons are injected by the electron gun for the high-energy electron injection and an inner electron gun for electron injection in the spherical net into the spherical net and between the spherical net and the anode of the inertial electrostatic confinement fusion apparatus, thereby reducing or eliminating a space charge force generated by deuterium ions, and increasing the deuterium ion density in the spherical net, so that neutron yield and a profit-loss ratio can be increased.

2 Claims, 3 Drawing Sheets

(56) References Cited

U.S. PATENT DOCUMENTS

| | | | | |
|---|---|---|---|---|
| 5,160,695 A * | 11/1992 | Bussard | .................... | H05H 1/03 |
| | | | | 376/145 |
| 7,180,242 B2 * | 2/2007 | Rostoker | .................. | H05H 1/10 |
| | | | | 315/111.41 |
| 7,482,607 B2 * | 1/2009 | Lerner | ..................... | G21B 3/00 |
| | | | | 250/493.1 |
| 9,715,945 B2 * | 7/2017 | Mohler | .................. | G21B 3/002 |
| 2008/0226010 A1 * | 9/2008 | Sesselmann | ............. | G21B 1/00 |
| | | | | 376/102 |
| 2022/0254520 A1 * | 8/2022 | Li | ........................... | G21B 1/05 |

FOREIGN PATENT DOCUMENTS

| | | | | | |
|---|---|---|---|---|---|
| CN | 109920559 A | | 6/2019 | | |
| CN | 111243765 A | | 6/2020 | | |
| CN | 116013553 A | * | 4/2023 | | |
| WO | WO-9530235 A2 | * | 11/1995 | ............... | G21B 1/03 |
| WO | WO-9924990 A2 | * | 5/1999 | ............... | H05H 3/06 |

\* cited by examiner

INERTIAL ELECTROSTATIC
CONFINEMENT FUSION APPARATUS FOR
ELECTRON INJECTION NEUTRALIZATION

TECHNICAL FIELD

The patent relates to the field of nuclear fusion and neutron sources.

BACKGROUND OF THE PRESENT INVENTION

Nuclear fusion power generation is a fundamental way to solve future energy problems of the human beings. At present, there are various kinds of nuclear fusion technologies in China and abroad, and main technical ways include four types: Tokamak, laser inertial confinement, Z pinch and inertial electrostatic confinement. These technologies have their own advantages and disadvantages. The inertial electrostatic confinement apparatus is smallest in size and least in power consumption, has no difficulty in ignition of fusion and has no complex plasma dynamics problems; the inertial electrostatic confinement apparatus has the defects that neutron yield is relatively low and the break-even balance of the energy is far to achieve; and these defects limit the development and application of the inertial electrostatic confinement fusion apparatus.

The structure of the inertial electrostatic confinement apparatus is generally as follows: a small spherical mesh (abbreviated as a spherical net) is arranged at a spherical center in a grounded spherical vacuum cavity; and the spherical net is a cathode and is fixed by a cathode high-voltage introduction supporting rod (abbreviated as a cathode rod) and loaded with negative high voltage. At present, working pressure of the inertial electrostatic confinement apparatus in foreign countries ranges from a dozen Pa to $10^{-2}$ Pa; the inputted electric power ranges from several hundred watts to several kilowatts; and the average neutron yield is as high as an order of $10^8$ n/s, and the corresponding power of the fusion is only at an order of mW. For the power input of 1 kW, the neutron yield required for achieving the break-even balance of the energy shall be more than $5\times10^{14}$ n/s. Therefore, how to improve the power of the fusion and increase the neutron yield under the same high-voltage input power is a key problem to be solved for realizing the break-even balance.

At present, a main reason for the low power of the fusion of the inertial electrostatic confinement apparatus is that the density of deuterium ions in the spherical net is excessively low; and an experimental measured value is $10^9/m^3$-$10^{10}/m^3$, but the minimal plasma density required by Tokamak is $10^{20}/m^3$. Therefore, how to increase the density of the deuterium ions in the spherical net is a key problem for improving the capacity power of the fusion.

When the inertial electrostatic confinement apparatus is loaded with high voltage of the power supply, under the action of a high-voltage electric field, deuterium molecules between the grounded spherical shell and the spherical net connected with negative high voltage are ionized; the electrons generated by the ionization move directly towards the spherical shell and are lost; and the deuterium ions generated by the ionization pass through the spherical net and oscillate around the spherical net. Therefore, plasma is difficult to form in a space between the spherical shell and the spherical net, but a positive electrical space is formed. The charge neutralization is difficult to be performed in the positive electrical space. However, because of the potential fixed by the cathode of the spherical net, as long as the density of the deuterium ions is not very high, the density of the deuterium ions in the spherical net may not be affected. If the density of the deuterium ions outside the spherical net is excessively high, resulting in excessively high intensity of the electric field, the high-voltage ignition is likely to occur, which is also a problem to be solved.

The applied high voltage may not form a potential difference inside the spherical net, that is, the inside of the spherical net should be equipotential. However, if the current of the deuterium ions injected into the spherical net is high, that is, the density of the deuterium ions is high, the density distribution of the deuterium ions may form a potential distribution; and moreover, the closer to the spherical center, the higher the density of the deuterium ions, and the higher the potential, thereby forming a virtual anode in the spherical net. The deuterium molecular gas inside the spherical net may be ionized by the high-density incident deuterium ion current; and the electrons generated by the ionization may oscillate around the virtual anode, so that the electron density at the center of the spherical net is increased. If the potential of the virtual anode is very high, a convergence effect of the ionized electrons may be enhanced, so that the central potential of the virtual anode is reduced, thereby forming a virtual cathode at the center of the virtual anode. If the size of the spherical net is relatively large, and the deuterium ion current is further increased, a smaller virtual anode is formed inside the virtual cathode, thereby forming multiple potential wells by repetition. As shown in FIG. 1, 11 indicates a position of a mesh of the spherical net; 2 indicates the grounded spherical shell serving as an anode of the inertial electrostatic confinement apparatus; 31 indicates the virtual cathode; 41 indicates the virtual anode; and 51 indicates a potential distribution curve.

The above multiple potential wells may improve the influence of a space charge force on the density of the centered deuterium ions to certain extent, but the multiple potential wells have a great adverse effect on the further improvement of the density of the centered deuterium ions. Because a large number of low-energy deuterium ions may be generated in the inertial electrostatic confinement apparatus and cannot be centered due to the existence of the multiple potential wells, it is difficult to further increase the density of the deuterium ions.

In general, how to solve the problem of the multiple potential wells is a key problem for further increasing the neutron yield and achieving the break-even balance of the inertial electrostatic confinement apparatus.

SUMMARY OF PRESENT INVENTION

For the above problems, the patent provides an electron injection neutralization technology so as to increase neutron yield and a profit-loss ratio (the profit-loss ratio is a ratio of total output energy to total input energy of the apparatus) of a fusion apparatus. Injected electrons can form special plasma with positive charges in the apparatus, thereby reducing or eliminating a space charge force formed by the positive charges. The electron injection neutralization includes two parts: the first one is high-energy electron injection on a grounded spherical shell; and the second one is internal electron injection inside a spherical net.

A technical solution of the present invention is as follows: an inertial electrostatic confinement fusion apparatus for electron injection neutralization includes an anode, a cathode, a cathode rod connected with the cathode, an electron gun for high-energy electron injection, an inner electron gun for electron injection in a spherical net, a vacuum system, and a high-voltage power supply system.

Further, in the inertial electrostatic confinement fusion apparatus for the electron injection neutralization, the cathode adopts a netted spherical structure (abbreviated as a spherical net) and is connected with a negative high-voltage power supply through the cathode rod; and the anode of the inertial electrostatic confinement fusion apparatus is used as a vacuum cavity wall for grounding.

Further, in the inertial electrostatic confinement fusion apparatus for the electron injection neutralization, the high-energy electron injection is that the electron gun is arranged on the anode of the inertial electrostatic confinement fusion apparatus; and a cathode of the electron gun is insulated from the anode of the inertial electrostatic confinement fusion apparatus and loaded with negative high voltage lower than the cathode spherical net of the inertial electrostatic confinement fusion apparatus, which is generally less than 10V. The electrons emitted from the electron gun move into the spherical net from the anode of the inertial electrostatic confinement fusion apparatus, and are slowed down to energy about 10 eV. Few electrons are lost before entering the spherical net. After the electrons enter the spherical net, because of low energy of electrons, a large number of electrons elastically collide with deuterium molecules of about 1 Pa gas pressure and converged deuterium ions confined in the spherical net under the action of multiple potential wells, thereby reducing a potential height of the multiple potential wells. The high-energy electron injection method may neutralize the space charge force of the deuterium ions in the spherical net and between the spherical net and the anode of the inertial electrostatic confinement fusion apparatus. The high-energy electron injection method has the advantages of simple structure and easy installation and operation, and has the defects that the capturing efficiency of the electrons by the spherical net is low and the consumed high-voltage power is high.

Further, in the inertial electrostatic confinement fusion apparatus for the electron injection neutralization, the internal electron injection inside the spherical net is that the inner electron gun is installed on a joint portion of the cathode rod and the spherical net, and the emitted electrons from the inner electron gun move to the center of the spherical net. The cathode potential of the inner electron gun is higher than the potential of the cathode of the spherical net, so that the electrons injected into the spherical net may not escape from the spherical net. Extraction anode potential of the inner electron gun is higher than the inner electron gun cathode. Extraction current intensity of the electron gun is in a 3/2-power relation with extraction voltage. In order to improve the extraction current intensity of the electrons, it is necessary to increase the extraction voltage. However, if the extraction voltage is excessively high, the potential distribution in the spherical net may be destroyed, which is unfavorable for the formation of high-density deuterium ion centering. Therefore, it is necessary to wrap a low-potential shielding cover outside the extraction anode of the electron gun so as to slow down the extracted electrons. In a movement process of the electrons towards the centering, the deuterium ion density is higher and higher, and the electrons are easily scattered elastically, which leads to the change of a movement track of the electrons and a process of oscillating around the virtual cathode, so that most of electrons cannot return to an emitting opening of the inner electron gun to avoid the loss. In order to further reduce the loss of the electrons in returning to the electron gun, the direction of the electrons emitted by the inner electron gun may slightly deviate from the center of the spherical net, so that a centripetal force of the deuterium ions that are distributed spherically may be used for deflecting the movement of the electrons. The internal electron injection has the advantages that the deuterium ions inside the spherical net may be neutralized well, the multiple potential wells inside the spherical net are reduced or eliminated, the plasma density of the centering is increased, and less power of the high-voltage power supply of the inner electron gun is consumed; and the internal electron injection has the defects that the diameter of the spherical net is relatively small and is generally about 10 cm, so that the installation space of the inner electron gun is small, and the difficulty of the installation is high.

The present invention has the beneficial effects that: according to the inertial electrostatic confinement fusion apparatus for the electron injection neutralization provided by the present invention, by adopting the high-energy electron injection and the electron injection in the spherical net, the deuterium ions in the spherical net and between the spherical net and the anode of the inertial electrostatic confinement fusion apparatus can be neutralized, so that the multiple potential wells in the spherical net are reduced or eliminated, the deuterium ion density in the spherical net is increased, and consequently, the neutron yield and the profit-loss ratio can be increased.

DETAILED DESCRIPTION OF PREFERRED EMBODIMENTS

Embodiments of the present invention are further described below in combination with the accompanying drawings.

Figure 1:
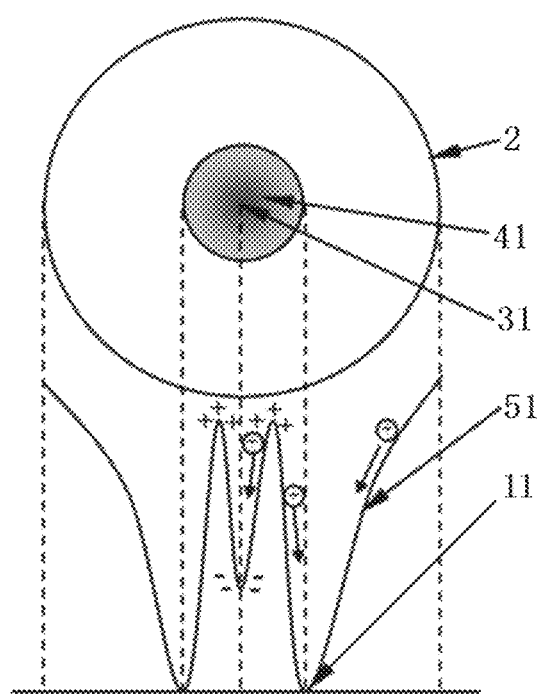
FIG. 1 is a schematic diagram of multiple potential wells of an inertial electrostatic confinement fusion apparatus.
Figure 2:
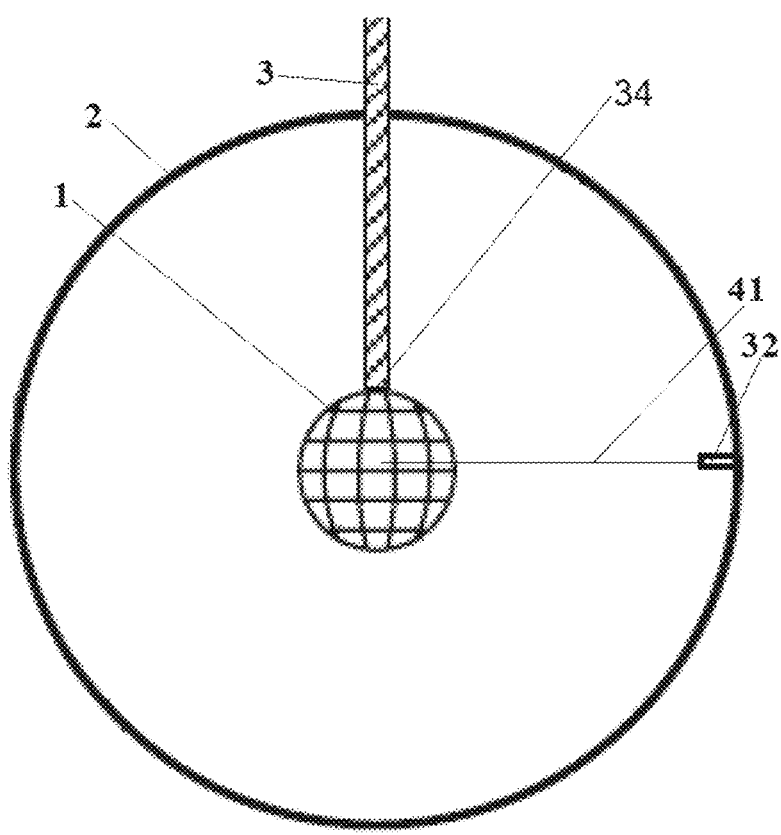
FIG. 2 is a structural schematic diagram of the inertial electrostatic confinement fusion apparatus for high-energy electron injection in an embodiment of the present invention.
Figure 4:
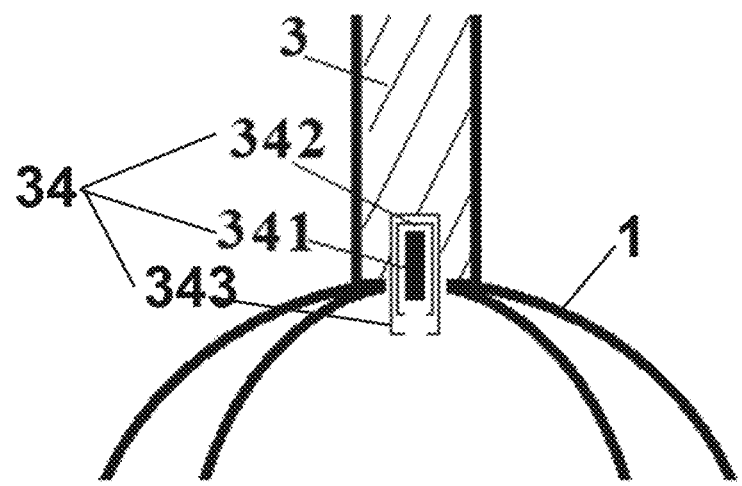
FIG. 4 is a structural schematic diagram of an inner electron gun for internal electron injection in a spherical net in an embodiment of the present invention.

As shown in FIG. 2 and FIG. 4, an inertial electrostatic confinement fusion apparatus for electron injection neutralization includes a cathode 1, an anode 2, a high-voltage introduction supporting rod 3 connected with the cathode, an electron gun 32 for high-energy electron injection, an inner electron gun 34 for electron injection in a spherical net, a vacuum system and a high-voltage power supply system. The vacuum system is used for maintaining a vacuum environment in a spherical shell and injecting low-pressure deuterium gas; and the high-voltage power supply system is used for generating negative high-voltage potential.

The deuterium gas pressure in the anode 2 ranges from a dozen Pa to $10^{-4}$ Pa. The anode 2 of the inertial electrostatic confinement apparatus is used as a vacuum cavity wall for grounding. The cathode 1 of the inertial electrostatic confinement apparatus adopts a netted spherical structure and is connected with negative high voltage of −50 KV (kiloVolts) through the cathode rod 3; and the cathode rod 3 is insulated from the anode 1. A movement track of electrons emitted from the electron gun 32 for the high-energy electron injection is a rectilinear track 41; and after entering a spherical net cathode 1, the electrons may elastically scatter in a certain probability, and are captured in the cathode of the spherical net.

Figure 3:
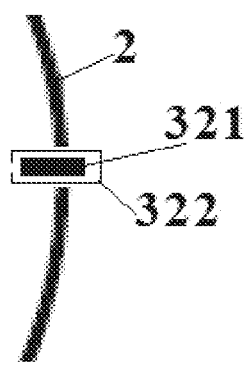
FIG. 3 is a structural schematic diagram of an electron gun for the high-energy electron injection in an embodiment of the present invention.

The electron gun 32 for the high-energy electron injection shown in FIG. 3 includes an electron gun cathode 321 and an electron gun anode 322. The electron gun cathode 321 is located with high voltage of −50.01 KV; and the electron gun anode 322 may be connected directly with the anode 2 of the inertial electrostatic confinement fusion apparatus. The energy of the electrons entering the spherical net is about 10 eV, and is scattered elastically by the deuterium ions in the spherical net and captured by the spherical net.

FIG. 4 is a local diagram of a junction of the high-voltage introduction supporting rod 3 and the cathode 1 of the spherical net; and the shown inner electron gun 34 for the internal electron injection in the spherical net includes an inner electron gun cathode 341, an inner electron gun anode 342 and a low-potential shielding cover 343. The potential of the inner electron gun cathode 341 is −49.95 KV; the potential of the inner electron gun anode 342 is −48 KV; and the potential of the low-potential shielding cover 343 is −49.9 KV. The electrons are first extracted from the inner electron gun cathode 341 under the action of the voltage of 1.95 KV between the electron gun cathode 341 and the inner electron gun anode 342, and then the energy of the electrons is slowed down to 50 eV through a deceleration effect of the low-potential shielding cover 343. In the movement process of the electrons towards the virtual anode in the spherical net, the electrons are elastically scattered by a large number of deuterium ions, and the movement direction of the electrons is changed, so that the electrons cannot be back into the electron gun. To further reduce the possibility that the electrons return to the electron gun, the movement track of the emitted electrons of the inner electron gun 34 may deviate from the center of the spherical net by a shortest distance of 1 cm, so that even if the electrons are not elastically scattered by the deuterium ions, the movement direction of the electrons may also be changed under the action of a central field.

Apparently, those skilled in the art can make various modifications and variations to the present invention without departing from the spirit and scope of the present invention. In this way, if these modifications and variations of present invention fall within the scope of the claims of the present invention and equivalent technologies thereof, the present invention is also intended to include these modifications and variations.

We claim:

1. An inertial electrostatic confinement fusion apparatus for electron injection neutralization, comprising
a cathode,
an anode,
a cathode rod,
an electron gun for high-energy electron injection,
an inner electron gun for electron injection in a spherical net, and
a low-potential shielding cover;
wherein the anode is a spherical shell;
the cathode is a spherical net and is arranged at a center in the spherical shell;
the cathode rod is used for supporting and fixing the spherical net and loading negative high voltage to the spherical net, and is also insulated with the spherical shell;
wherein the inner electron gun for electron injection in the spherical net is installed at a joint portion of the cathode rod and the spherical net;
the inner electron gun comprise an inner electron gun cathode, an inner electron gun anode and the low-potential shielding cover;
wherein the inner electron gun anode is located between the inner electron gun cathode and the low-potential shielding cover, and the low-potential shielding cover is located at an outermost side.

2. The inertial electrostatic confinement fusion apparatus for the electron injection neutralization according to claim 1, wherein the electron gun for the high-energy electron injection is installed on the spherical shell.

* * * * *